US 6,640,793 B1

(12) United States Patent
Kabat et al.

(10) Patent No.: US 6,640,793 B1
(45) Date of Patent: Nov. 4, 2003

(54) VALVE ASSEMBLY AND METHOD FOR CONTROLLING FLOW OF GASES FROM AN ENGINE CRANKCASE TO AN ENGINE INTAKE MANIFOLD

(75) Inventors: Daniel Michael Kabat, Oxford, MI (US); Allan Joseph Kotwicki, Williamsburg, MI (US); Bryan Christopher Stoll, South Lyon, MI (US); Furqan Zafar Shaikh, Troy, MI (US); Rodney John Tabaczynski, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/065,674
(22) Filed: Nov. 7, 2002
(51) Int. Cl.⁷ ............................................... F16K 17/04
(52) U.S. Cl. ...................................................... 123/574
(58) Field of Search ................................. 123/572, 573, 123/574

(56) References Cited

U.S. PATENT DOCUMENTS

| 3,263,660 A | | 8/1966 | Hyde |
| 3,359,960 A | * | 12/1967 | Pittsley ...................... 123/574 |
| 3,709,204 A | | 1/1973 | Noponen |
| 4,483,309 A | * | 11/1984 | Normal et al. ............... 123/574 |
| 5,024,203 A | * | 6/1991 | Hill .............................. 123/573 |

* cited by examiner

Primary Examiner—Marguerite McMahon
(74) Attorney, Agent, or Firm—John F. Buckert; Allan J. Lippa

(57) ABSTRACT

A valve assembly and method for controlling flow of gases through a passage between an engine crankcase and an engine intake manifold is provided. The method includes increasing a flow of gases through the passage between the crankcase and the intake manifold when a temperature of the gases is below a predetermined temperature.

10 Claims, 6 Drawing Sheets

VALVE ASSEMBLY AND METHOD FOR CONTROLLING FLOW OF GASES FROM AN ENGINE CRANKCASE TO AN ENGINE INTAKE MANIFOLD

BACKGROUND OF INVENTION

1. Field of the Invention

The invention relates to a valve assembly and method for controlling flow of gases from an engine crankcase to an engine intake manifold.

2. Background of the Invention

Positive crankcase ventilation (PCV) valves have long been used to remove crankcases gases from the crankcase of an engine. Crankcases gases are a combination of (i) blowby gases, (i.e., combusted and non-combusted combustion chamber gases which migrate past piston rings into the crankcase), (ii) fuel, (iii) air, and (iv) oil vapor. PCV valves regulate the removal of crankcase gases from the crankcase by venting the gases into the engine intake manifold.

One known PCV valve is disclosed in U.S. Pat. No. 3,709,204. The known PCV valve shuts off the flow of gases from a crankcase to an intake manifold until the temperature of the engine has increased above a predetermined temperature. In particular, the known valve shuts off flow of the gases during cold engine starting. Another similar PCV valve system is disclosed in U.S. Pat. No. 3,263,660 that shuts off flow during cold engine starting.

The inventors herein have recognized that there are several disadvantages with stopping the flow of crankcase gases from a crankcase to an intake manifold during cold operating conditions. First, the inventors herein have recognized that during cold operating conditions, crankcase gases are more likely to react with oil to form sludge, which in turn can adversely effect the oil lubrication properties resulting in increased engine wear. Thus, stopping the flow of fresh air into the crankcase can increase the tendency of engine oil sludge formation. Second, the inventors herein have recognized that because a byproduct of combustion is water, the crankcase gases are relatively humid. Thus, stopping the flow of fresh air into the crankcase results in a relatively high crankcase humidity where the water vapor can freeze within the PCV valve during cold operating conditions. This ice formation can adversely effect the operation of the PCV valve until the valve is de-thawed.

SUMMARY OF INVENTION

The foregoing problems and disadvantages are overcome by a valve assembly and method for controlling flow of gases from an engine crankcase to an intake manifold in accordance with the present invention.

A method for controlling flow of gases through a passage between an engine crankcase and an engine intake manifold according to a first aspect of the present invention is provided. The method includes increasing a flow of gases through the passage between the crankcase and the intake manifold when a temperature of the gases is below a predetermined temperature.

A valve assembly for controlling flow of gases through a passage between an engine crankcase and an engine intake manifold in accordance with a second aspect of the present invention is provided. The valve assembly includes a housing configured to be coupled with the passage. The valve assembly further includes a flow control device disposed in the housing. The device increases a flow of the gases through the housing when a temperature of the gases is below a predetermined temperature.

A control system for controlling flow of gases through a passage between an engine crankcase and an engine intake manifold according to a third aspect of the present invention is provided. The control system includes a temperature sensor generating a first signal indicative of a temperature of the engine. The control system further includes a valve assembly having a housing and a flow control device disposed in the housing. The housing is configured to be coupled with the passage. The flow control device is configured to increase a flow of the gases through the housing responsive to a second signal. Finally, the control system includes a controller operably connected to the temperature sensor and the valve assembly. The controller generates the second signal when the first signal indicates the temperature is below a predetermined temperature.

The valve assembly, control system, and method for controlling the flow of gases from an engine crankcase to an intake manifold has several advantages over known systems. In particular, the valve assembly and method increases a flow of crankcase gases through the passage between the crankcase and the intake manifold when a temperature of the gases is below a predetermined temperature to reduce and/or eliminate (i) freezing and development of ice blockages within the valve assembly, and (ii) sludge formation from trapped crankcase gases reacting with engine oil.

DETAILED DESCRIPTION

Figures 1, 2:
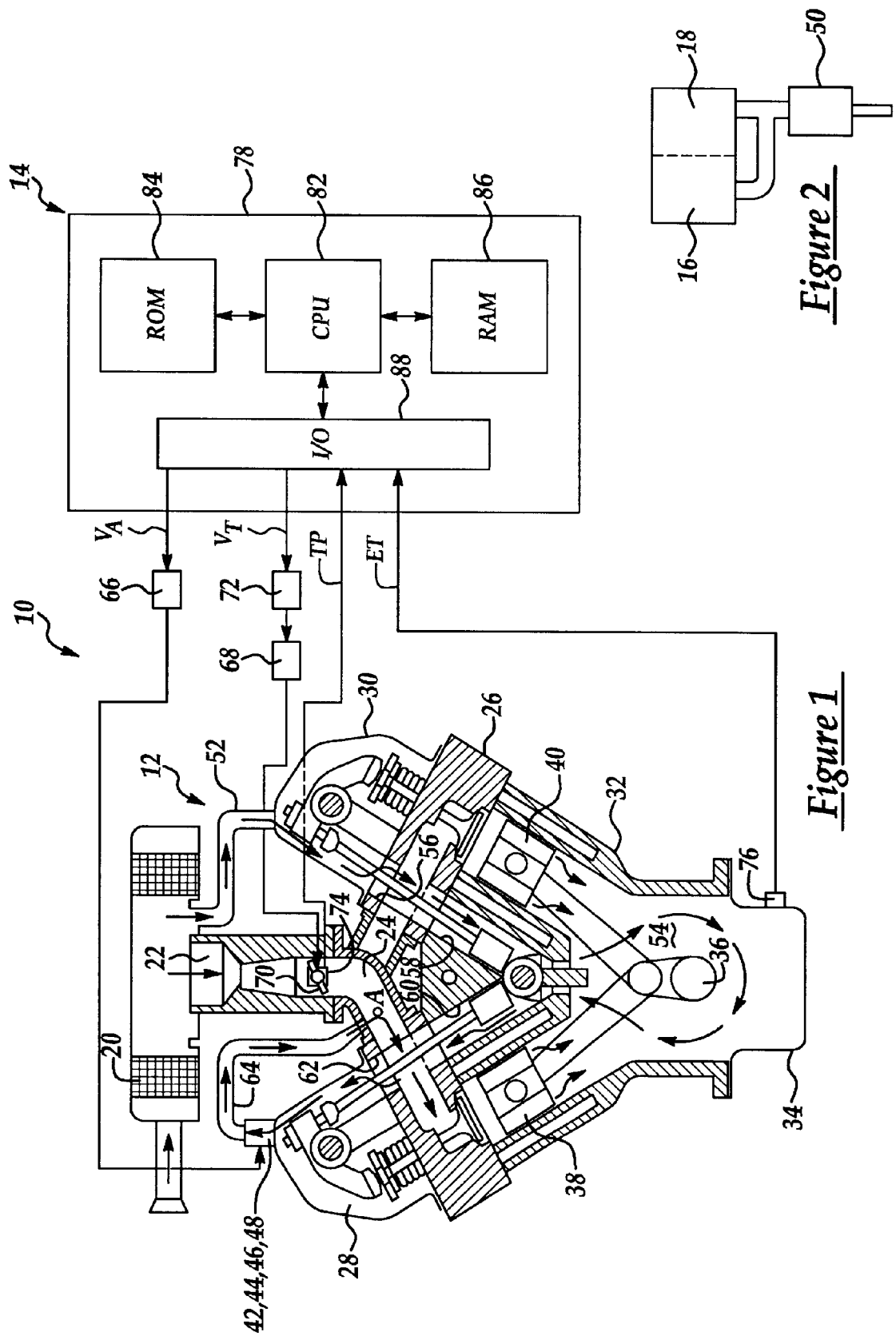
FIG. 1 is a schematic of a vehicle having an engine and an engine control system.
FIG. 2 is a simplified schematic of the engine of FIG. 1 and an exhaust system coupled to the engine.

Referring now to the drawings, like reference numerals are used to identify identical components in the various views. Referring to FIGS. 1 and 2, an automotive vehicle 10 includes an internal combustion engine 12 and an engine control system 14.

Engine 12 may include a plurality of cylinders in cylinder banks 16, 18. Engine 12 may further include an air filter 20, a throttle body 22, an intake manifold 24, an engine head 26, cam covers 28, 30, an engine block 32, an oil pan 34, a crankshaft 36, pistons 38, 40, a valve assembly comprising one of valve assemblies 42, 44, 46, 48 described below, and a catalytic converter 50.

Engine 12 inducts air through filter 20 into both throttle body 22 and a conduit or passage 52. The air inducted into throttle body 22 is routed past throttle plate 70 to intake manifold 24. Thereafter, the air is inducted into the engine cylinders where an air-fuel mixture is combusted. During or after a combustion cycle, a portion of the gases in cylinder banks 16, 18 hereinafter referred to as crankcase gases, migrate past pistons 38, 40 into an engine crankcase 54. As discussed above, these crankcase gases can mix with the oil in crankcase 54 to form sludge which can degrade performance of engine 12.

To remove the crankcase gases from crankcase 54, a portion of the air from air filter 20 is routed through a conduit 52 to an interior volume defined by cam cover 30. From the interior volume of cam cover 30, the inducted air flows through conduit 56 (in engine head 26) and conduit 58 (in engine block 32) to reach crankcase 54. In engine crankcase 54, the inducted air mixes with the blowby gases and oil vapor to form a diluted mixture of crankcase gases.

Thereafter, the diluted crankcase gases flow through conduit 60 (in engine block 32) and conduit 62 (in engine head 26) to cam cover 28. From cam cover 28, one of valve assemblies 42, 44, 46, 48 in accordance with the present invention will be utilized to control flow of the crankcase gases into intake manifold 24. As illustrated, a portion of valve assembly extends through a top surface of cam cover 28 to control the flow of crankcase gases into intake manifold 24. In particular, the gases flow through the valve assembly and through conduit 64 to intake manifold 24. Thereafter, the crankcase gases mix with incoming air from throttle body 22 and are inducted into the engine cylinders.

Referring to FIG. 2, the crankcase gases and other combusted gases flow from the engine cylinders to catalytic converter 50 which is used to oxidize carbon monoxide (CO) and hydrocarbons (HC) and to reduce nitrogen oxides (NOx).

Referring to FIG. 1, engine control system 14 is provided to control operation of engine 12. Control system 14 includes a current driver 66, an electric motor 68 for controlling throttle plate 70, an ETC driver 72, a throttle position sensor 74, a temperature sensor 76, and a controller 78.

Current driver 66 is provided to generate a current to actuate a solenoid 80 in valve assembly 46 responsive to a signal ($V_A$) from controller 78, as discussed in greater detail below.

Electric motor 68 is provided to move throttle plate 70 to a predetermined position responsive to a current received from ETC driver 72. ETC driver 72 generates the current responsive to a control signal ($V_T$) from controller 78.

Throttle position sensor 74 generates a signal (TP) indicating a throttle position of throttle plate 70 received by controller 78 for closed-loop position control of plate 70.

Temperature sensor 76 generates a signal (ET) indicative of an oil temperature that is received by controller 78. Sensor 76 may be coupled to oil pan 34. Alternately, sensor 76 could measure an engine coolant temperature (ECT), an engine block temperature, or any other temperature indicative of an operating condition of engine 12.

Controller 78 is utilized to control operation of valve assembly 46 described in greater detail below. Controller 78 includes a microprocessor 82 communicating with various computer-readable storage media. The computer readable storage media preferably include nonvolatile and volatile storage in a read-only memory (ROM) 84 and a random-access memory (RAM) 86. The computer readable media may be implemented using any of a number of known memory devices such as PROMs, EPROMs, EEPROMs, flash memory or any other electric, magnetic, optical or combination memory device capable of storing data, some of which represent executable instructions, used by microprocessor 82 in controlling engine 12. Microprocessor 82 communicates with various sensors and actuators (discussed above) via an input/output (I/O) interface 88.

Figure 3A:
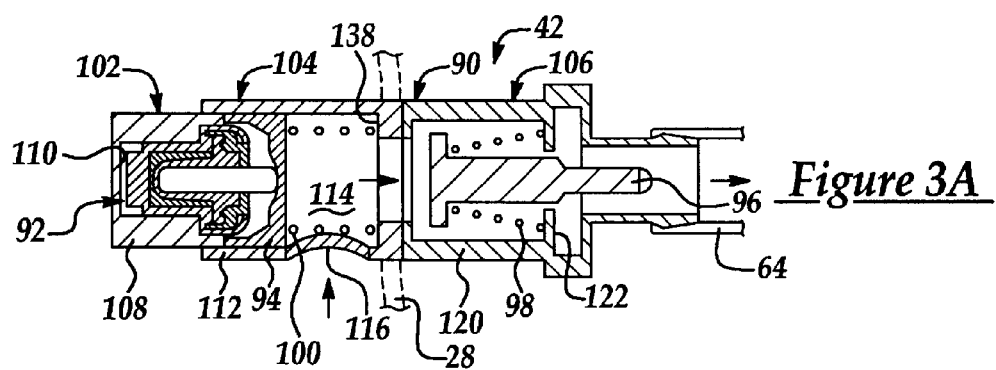
FIGS. 3A–3B are schematics of a valve assembly in accordance with a first embodiment of the present invention.

Referring to FIG. 3A, valve assembly 42 in accordance with a first aspect of the present invention is shown. Valve assembly 42 is provided to control flow of gases from engine crankcase 54 to intake manifold 24. As will be described in greater detail below, assembly 42 can decrease a flow of diluted crankcase gases during relatively warm engine conditions to reduce the amount of oil entering the intake and exhaust systems. Further, the valve assembly 42 can increase a flow of diluted crankcase gases during relatively cold engine conditions to reduce sludge formation in crankcase 54. Valve assembly 42 includes a housing 90, an actuator 92, a piston 94, a pintle 96, and bias springs 98, 100.

Housing 90 includes first, second, third housing portions 102, 104, 106 which may be constructed of metal. Housing portion 102 includes a closed-ended tubular wall 108 that defines an internal volume 110. Wall 108 is configured to hold an actuator such as a wax motor 92 therein and may be threadably coupled to a first end of housing portion 104.

Housing portion 104 has an outer wall 112 that is generally tubular-shaped and defines an internal volume 114. Housing portion 104 is configured to hold piston 94 therein. Portion 104 includes an aperture 116 extending through outer wall 112 for communicating crankcase gases from an interior volume of cam cover 28 into valve assembly 42. Housing portion 104 has a second end that may be threadably coupled to housing portion 106.

Figure 7A:
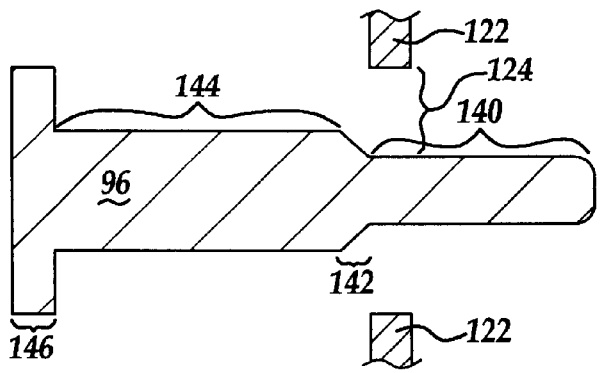
FIG. 7A is an enlarged schematics of a pintle illustrated in the valve assembly of FIG. 3A.

Housing portion 106 has an outer wall 120 that is generally tubular-shaped and defines an internal volume 118. Housing portion 106 includes a ring-shaped metering wall 122 extending inwardly from outer wall 120. Referring to FIGS. 3A, 7A, wall 122 is provided to define a metering orifice 124 between pintle 96 and wall 122 to control flow through assembly 42. As shown, pintle 96 is biased axially away from wall 122 via bias spring 98.

Figure 8A:
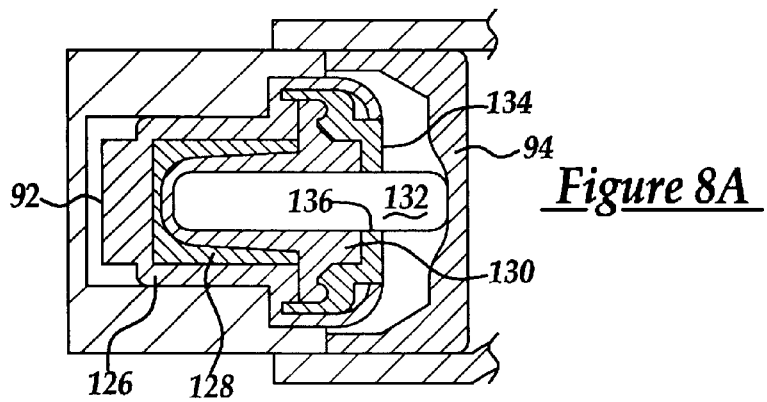
FIGS. 8A–8B are schematics of a wax motor in first and second operational positions.

Referring to FIGS. 3A, 8A, wax motor 92 is provided to control a position of piston 94 to vary flow of crankcase gases through aperture 116 based on a temperature of the crankcase gases. Thus, the combination of wax motor 92 and piston 94 comprises a flow control device in assembly 42. Motor 92 includes a brass housing 126, a wax layer 128, a rubber boot 130, a drive pin 132, and a cap 134.

Motor housing 126 is provided to conduct heat from housing portion 102 to wax layer 128 and may be disposed within housing portion 102. Motor housing 126 may be constructed from a thermally conductive metal such as brass for example.

Figure 8B:
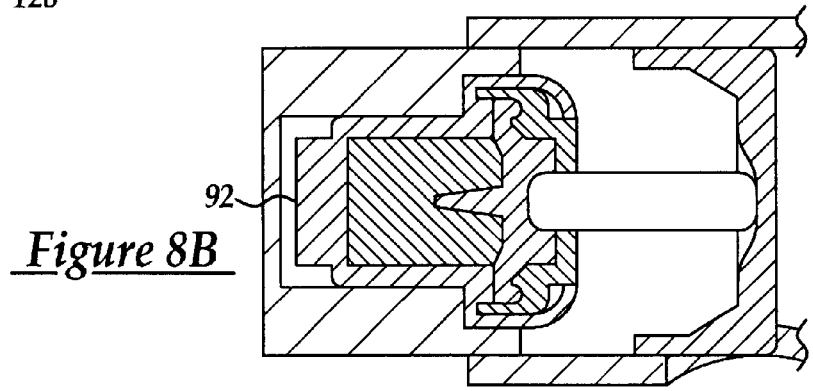

The wax layer 128 has a volume that expands and contracts based on a temperature of layer 128. Layer 128 expands when the temperature therein is above a predetermined temperature causing an adjacent rubber boot 130 move drive pin 132 in a first axial direction (right in FIG. 8B). The predetermined temperature may be within the range of 120–130° F., for example. It should be understood, however, that the predetermined temperature could be outside the range of 120–130° F. based on a desired temperature response of assembly 42. Layer 128 contracts when an internal temperature is below the predetermined temperature causing boot 130 to move drive pin 132 in a second axial direction (left in FIG. 8A). Layer 128 is disposed within brass housing 126 and is composed of wax and copper particles. The ratio of the mass of wax to the mass of copper particles determines the predetermined temperature when the volume of layer 128 increases from the volume shown in FIG. 8A to the larger volume shown in FIG. 8B, as known to those skilled in the art. Rubber boot 130 is coupled between wax layer 128 and cap 134. Cap 134 may be constructed of metal and may be threadably coupled to motor housing 126. Drive pin 132 extends through an aperture 136 in cap 134 and is coupled at a first end to boot 130. Drive pin 132 is further coupled at a second end to piston 94. Drive pin 132 and piston 94 are moved axially by boot 130 responsive to the temperature-dependent volume of layer 128.

Figure 3B:
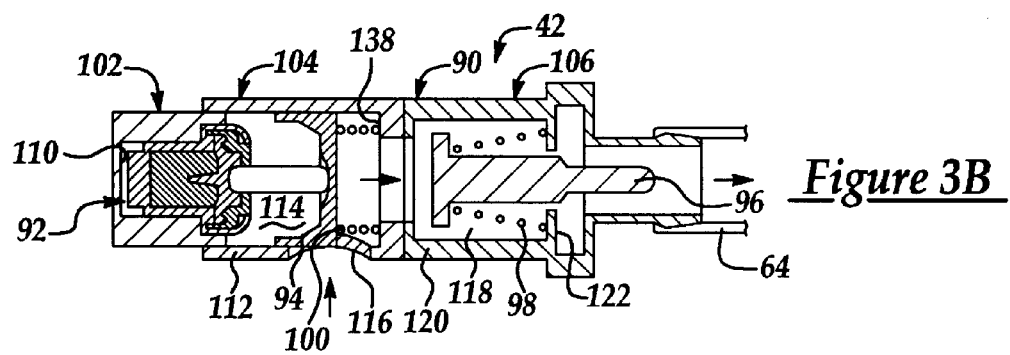

Referring to FIG. 3A, piston 94 is provided to control a flow area through aperture 116. As shown, piston 94 has a first open operational position where crankcase gases are not restricted from flowing into housing 90. Referring to FIG. 3B, piston 94 has a second closed operational position where crankcase gases are substantially restricted from flowing into housing 90. Bias spring 100 is disposed between piston 94 and wall 138 of housing portion 104 and biases piston 94 toward a closed position (to the left in FIG. 3A). Thus, motor 92 must overcome the force of bias spring 100 to restrict flow through aperture 116.

Figure 9:
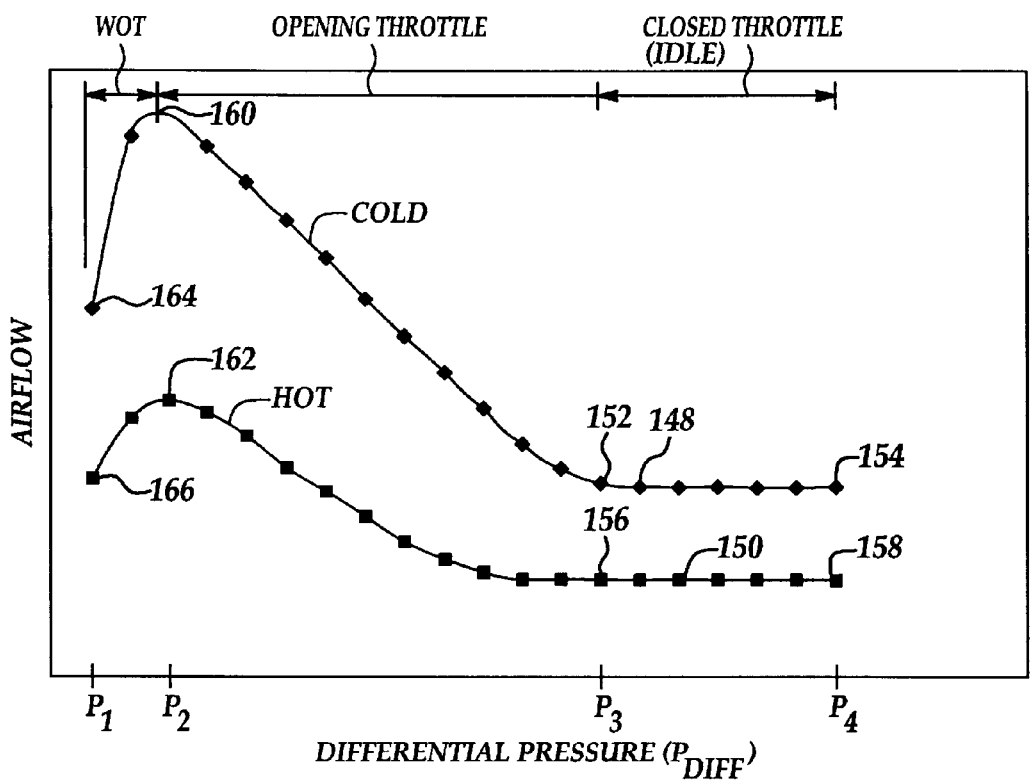
FIG. 9 is a schematic showing flow characteristics of the various embodiments of a valve assembly during warm and cold engine operating conditions.

Referring to FIGS. 3B and 7A, pintle 96 is provided to control a size of a metering orifice 124 based on a differential pressure ($P_{DIFF}$) (i.e., $P_{DIFF}=P_{CC}-P_{MANN}$), where ($P_{CC}$) is the cam cover pressure and ($P_{MAN}$) is the intake manifold pressure. Pintle 96 includes body portions 140, 142, 144 and a flange section 146. Bias spring 98 disposed in housing portion 106 between flange section 146 and metering wall 122 biases pintle 96 toward an open position (to the left in FIG. 3A). Referring to FIGS. 3A, 9, the operation of valve assembly 42 will be explained in greater detail. The typical operational flow characteristics of assembly 42 are shown during cold and warm engine conditions in flow curves 148, 150, respectively. As shown, the flow during cold engine conditions (e.g., curve 148) is greater than the flow during hot engine conditions (e.g., curve 150). The flow offset between the curves 148, 150 is determined primarily by an operational position of piston 94. The shape of curves 148, 150 is determined primarily by the operational position of pintle 96 relative to the metering wall 122. The operational position of pintle 96 is determined based on the differential pressure ($P_{DIFF}$) between the cam cover pressure ($P_{CC}$) and the intake manifold pressure ($P_{MAN}$) as will be explained in greater detail below.

Referring to FIG. 3A, during cold engine conditions when the temperature of the crankcase gases are less than a predetermined temperature, piston 94 is maintained at an open position relative to aperture 116. Crankcase gases enter aperture 116 from an interior volume of cam cover 28 with minimal flow restriction from piston 94. As discussed above, the curve 148 illustrates the flow characteristics of valve assembly 42 during the cold operating conditions.

Referring to FIG. 3B, during warm operating conditions when the temperature of the crankcase gases are greater than a predetermined temperature, such as 130° F., piston 94 is moved to a closed position relative to aperture 116. Accordingly, the flow of crankcase gases through aperture 116 is restricted by piston 94. As discussed above, the curve 150 illustrates the flow characteristics of valve assembly 42 during the warm operating conditions.

The operation of valve assembly 42 based on the differential pressure ($P_{DIFF}$) will now be described in greater detail.

When throttle plate 70 communicating with intake manifold 24 is in a closed position during engine idle operation, the intake manifold pressure ($P_{MAN}$) is decreased to a relatively low pressure level. Accordingly, the combustion pressure ($P_{COMB}$) in the engine cylinders are also at relatively low pressure levels. Thus, the amount of crankcase gases that migrate past the piston seals (not shown) into crankcase 54 is relatively low. Because a relatively small amount of crankcase gases flow into crankcase 54, the cam cover pressure ($P_{CC}$) is maintained at a relatively constant pressure approximately at atmospheric pressure. Further, the differential pressure ($P_{DIFF}$) (i.e., $P_{DIFF}=P_{CC}-P_{MAN}$) is relatively high which causes pintle 96 to move to the right in FIG. 3A. In particular, referring to FIGS. 3A, 7A, pintle portion 144 is moved proximate wall 122 to obtain a relatively small metering orifice 124—which provides a relatively low flow rate through valve assembly 42. The radial distance between pintle portion 144 and wall 122 may be 0.35 mm for example.

Referring to FIG. 9, for example, during both warm and cold engine operating conditions when throttle plate 70 is closed, the differential pressure ($P_{DIFF}$) may between the values ($P_3$), ($P_4$). During cold operating conditions, the flow rate through assembly 42 may be maintained at a relatively constant value as illustrated by flow values 152, 154. During warm operating conditions, the flow rate may be maintained at a lower constant value as illustrated by flow values 156, 158.

When throttle plate 70 is moved toward an open position, the intake manifold pressure ($P_{MAN}$) is increased along with the combustion pressure ($P_{COMB}$) in the engine cylinders. The increase in combustion pressure increases the amount of crankcase gases that migrate past the piston seals. (not shown) into crankcase 54. The increase in crankcase gas flow into crankcase 54 increases the cam cover pressure ($P_{CC}$). Thus, as throttle plate 70 is moved from the closed position toward the open position, the differential pressure ($P_{DIFF}$) (i.e., $P_{DIFF}=P_{CC}-P_{MAN}$) across valve assembly 42 is decreased. The decrease in differential pressure ($P_{DIFF}$) causes pintle 96 to move to the left in FIG. 3A. In particular, pintle portion 142 is moved proximate wall 122 to increase the size of the metering orifice 124—which increases the flow rate through valve assembly 42.

Referring to FIG. 9, for example, during both warm and cold operating conditions when opening throttle plate 70, the differential pressure ($P_{DIFF}$) across assembly 42 may decrease from pressure value ($P_3$) to value ($P_2$). Further, during cold operating conditions, the flow rate illustrated by curve 148 may be increased from flow value 152 to flow value 160 while opening throttle plate 70. Similarly, during warm operating conditions, the flow rate illustrated by curve 150 may be increased from flow value 156 to flow value 162 while opening throttle plate 70. 1When throttle plate 70 reaches a full-open position, the intake manifold pressure ($P_{MAN}$) approaches the cam cover pressure ($P_{CC}$)—which is approximately atmospheric pressure. Further, the combustion pressure ($P_{COMB}$) in the engine cylinders approaches a maximum value. This in turn causes the crankcase gases to flow at a maximum flow rate into crankcase 54. As a result, the differential pressure ($P_{DIFF}$) across valve assembly 42 approaches a minimum differential pressure. The relatively low differential pressure ($P_{DIFF}$) causes pintle 96 to move further left in FIG. 3A. In particular, referring to FIGS. 3A, 7A, pintle portion 140 is moved proximate metering wall 122 to obtain the maximum sized metering orifice 124 to obtain a maximum flow through valve assembly 42. The radial distance between pintle portion 140 and wall 122 may be 1.85 mm, for example.

Referring to FIG. 9, for example, during both warm and cold operating conditions when throttle plate 70 is at a full-open position, the differential pressure ($P_{DIFF}$) across valve assembly 42 may range from pressure value ($P_1$) to value ($P_2$) depending on the robustness of the piston seals (not shown). For example, if the piston seals are substantially preventing crankcase gases from flowing to crankcase 54, the differential pressure ($P_{DIFF}$) would be equal to pressure value ($P_1$). In contrast, if the piston seals were allowing some crankcase gases to reach crankcase 54, the differential pressure ($P_{DIFF}$) could be equal to pressure value ($P_2$). During cold operating conditions, the flow rate illustrated by curve 160 may range from flow value 164 to flow value 160. Further, during warm operating conditions, the flow rate illustrated by curve 162 may range from flow value 166 to flow value 162.

Figure 4A:
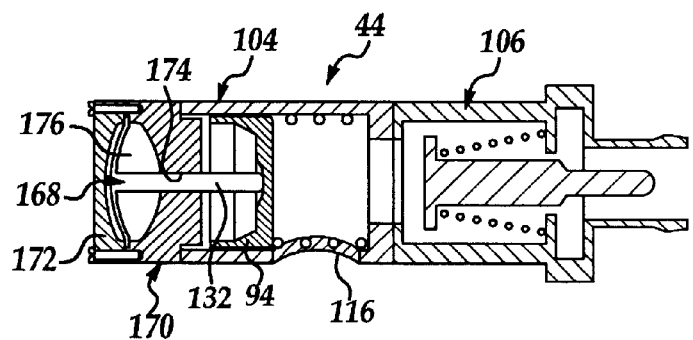
FIGS. 4A–4B are schematics of a valve assembly in accordance with a second embodiment of the present invention.

Referring now to FIG. 4A, valve assembly 44 in accordance with a second aspect of the present invention is shown. The valve assembly 44 is similar to valve assembly 42 except that wax motor 92 of assembly 42 is replaced with a bi-metallic actuator 168 and housing portion 102 is replaced with housing portion 170 and cap 172. Accordingly, only these new components will be discussed in detail since the remaining components of valve assembly 44 are identical to assembly 42 discussed above.

Housing portion 170 may be threadably coupled at a first end to housing portion 104. Housing portion 170 includes an aperture 174 extending axially therethrough for receiving a drive pin 132. Cap 172 may be coupled to a second end of housing portion 170 to define an internal volume 176. Housing portion 170 and cap 172 may be constructed from a thermally conductive material such as steel.

Figure 4B:
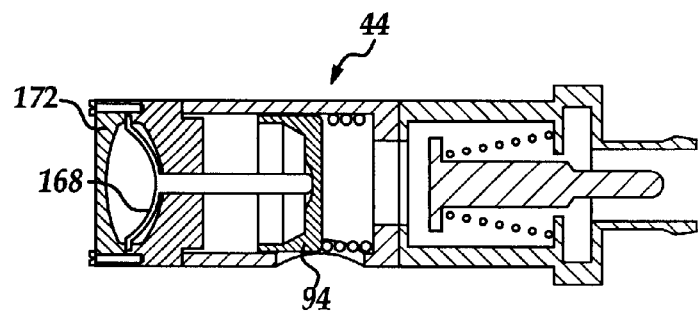

Bi-metallic actuator 168 is disposed in volume 176 and is constructed from two laminated metal layers 169 (not shown) having different heat expansion ratios, and drive pin 132. The metal layers 169 may be constructed from a first layer of invar adjacent a second layer of brass. The combination of actuator 168 and piston 96 comprises a flow control device in assembly 44. Referring to FIG. 4A, when a temperature of the crankcase gases are below a predetermined temperature, actuator 168 flexes toward cap 134 to move piston 94 to an open position relative to aperture 116 to increase or maintain flow through valve assembly 44. Referring to FIG. 4B, when the temperature of the crankcase gases increases above the predetermined temperature, actuator 168 flexes away from cap 172 to move piston 94 toward a closed position relative to aperture 116 to decrease flow through assembly 44.

Thus, like actuator 92 of valve assembly 42, actuator 168 of valve assembly 44 decreases flow during warm operating conditions and increases flow during cold operating conditions. Further, referring to FIG. 9, assembly 44 may have flow characteristics as illustrated by curves 148, 150.

Figure 5A:
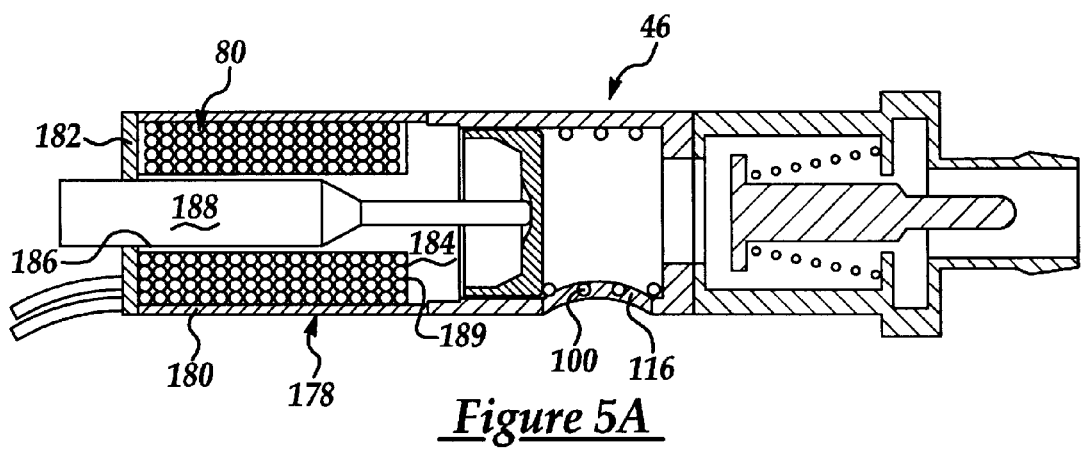
FIGS. 5A–5B are schematics of a valve assembly in accordance with a third embodiment of the present invention.

Referring to FIG. 5A, valve assembly 46 in accordance with a third aspect of the present invention is shown. Valve assembly 46 is similar to valve assembly 42 except that wax motor 92 of assembly 42 is replaced with a solenoid 80 and housing portion 102 is replaced with housing portion 178.

Accordingly, only these new components will be discussed in detail since the remaining components of valve assembly 46 may be identical to assembly 42 discussed above.

As illustrated, housing portion 178 may include an outer wall 180, a bottom wall 182 adjacent wall 180. Walls 180, 182 define an inner volume 184 for holding solenoid 80. Further, wall 182 may include an aperture 186 extending therethrough for receiving an armature 188 of solenoid 80.

Figure 10:
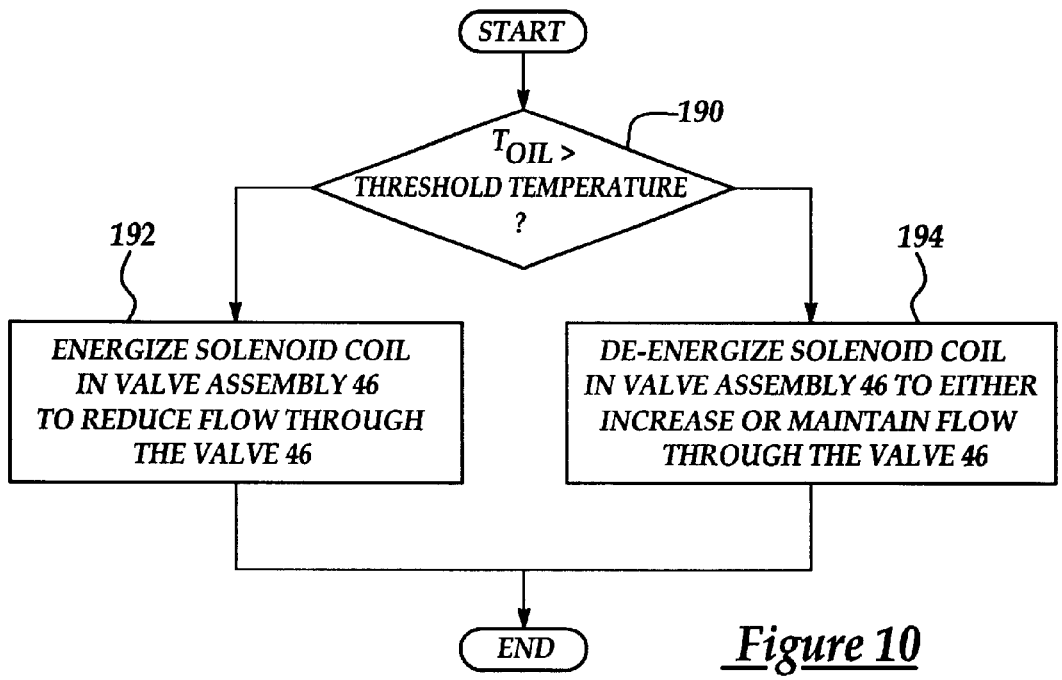
FIG. 10 is a flowchart for controlling flow from an engine crankcase to an engine intake manifold using the valve assembly of FIGS. 6A–6B.

Solenoid 80 is disposed in volume 184 and includes a coil 189 surrounding armature 188. Referring to FIG. 10, at step 190, when controller 78 determines an engine temperature—indicated by signal (ET)—is above a predetermined temperature, controller 78 will generate signal ($V_A$) to energize coil 88 at step 192.

Figure 5B:
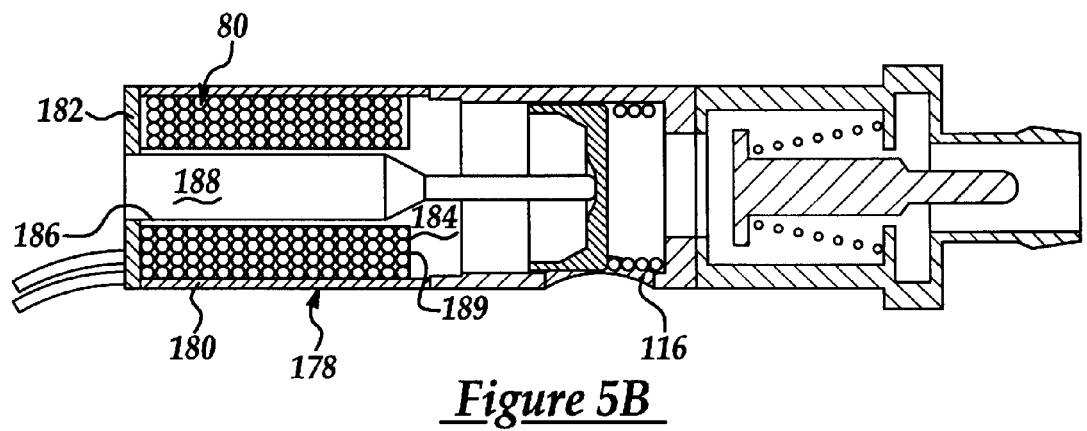

Referring to FIG. 5B, the energized coil 189 induces armature 188 to move piston 94 toward a closed position relative to aperture 116 to decrease flow through assembly 46. Alternately, at step 190, when controller 78 indicates an engine temperature is below a predetermined temperature, controller 78 will de-energize coil 88 at step 194. Referring to FIG. 5A, bias spring 100 in turn moves or holds piston 94 in an open position relative to aperture 116 to increase or maintain flow through aperture 116. Thus, the combination of solenoid 80 and piston 96 comprises a flow control device in assembly 46.

Like wax motor 92 of valve assembly 42, solenoid 80 decreases flow through valve assembly 46 during warm operating conditions and increases flow through valve assembly 46 during cold operating conditions. Further, referring to FIG. 9, assembly 46 may have flow characteristics as illustrated by curves 148, 150.

Figure 6A:
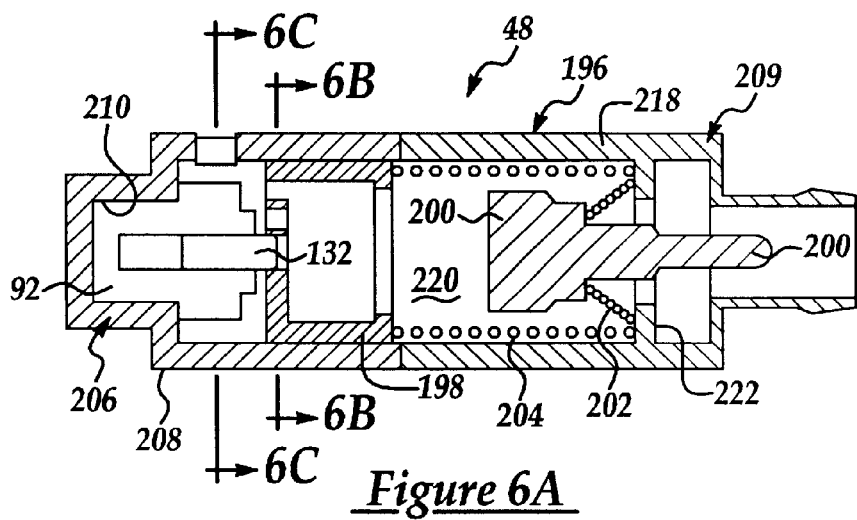
FIGS. 6A–6F are schematics of a valve assembly in accordance with a fourth embodiment of the present invention.

Referring to FIG. 6A, valve assembly 48 in accordance with a fourth aspect of the present invention is shown. Valve assembly 48 operates similar as valve assembly 42 to decrease flow of crankcase gases through assembly 48 during warm operating conditions and to increase flow during cold operating conditions.

Valve assembly 48 includes a housing 196, an actuator 92, a sleeve 198, a pintle 200, and bias springs 202, 204.

Figure 6B:
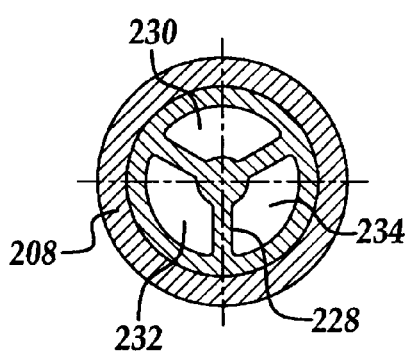
Figure 6C:
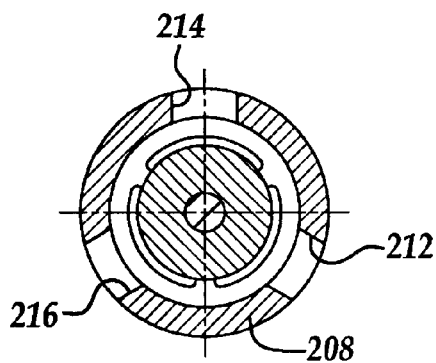
Figure 7B:
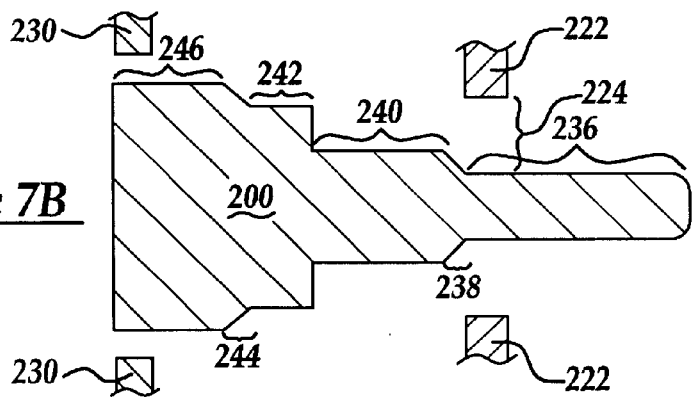
FIG. 7B is an enlarged schematics of a pintle illustrated in the valve assembly of FIG. 6A.

Housing 196 includes first and second housing portions 206, 209. Housing portion 206 includes a closed-ended tubular wall 208 that defines an internal volume 210. Wall 208 is configured to hold an actuator such as a wax motor 92 therein and may be threadably coupled to a first end of housing portion 196. Referring to FIG. 6C, wall 208 includes a plurality of apertures 212, 214, 216 extending therethrough for communicating crankcase gases from crankcase 54 into housing 196. Apertures 212, 214, 216 may be disposed 120 degrees apart from one another around the circumference of wall 208.

portion 209 has an outer wall 218 that is generally tubular-shaped and defines an internal volume 220. Referring to FIGS. 6A, 7B, housing portion 208 includes a metering wall 222 extending inwardly from outer wall 218. Wall 222 is provided to define a metering orifice 224 between pintle 200 and wall 222 to control flow through assembly 48. As shown, pintle 200 is biased away from wall 222 via bias spring 202.

Wax motor 92, as described in valve assembly 42, may be used in valve assembly 48. In alternate embodiments of assembly 48, however, bi-metallic actuator 168 or solenoid actuator 80 could be used instead of motor 92. As shown, motor 92 is disposed within volume 210 and is provided to control an axial position of sleeve 198.

Figure 6D:
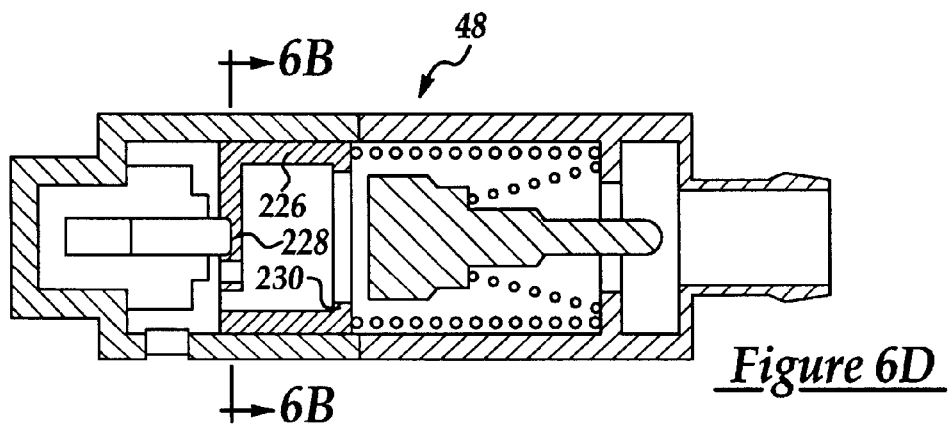

Referring to FIG. 6D, sleeve 198 is provided to control flow of crankcase gases through assembly 48 during warm operating conditions as will be explained in greater detail below. Sleeve 198 includes an outer tubular wall 226, a spoke portion 228 coupled to a first end of wall 226, and a metering wall 230 extending inwardly from outer wall 226. Referring to FIG. 6B, spoke portion 228 defines apertures 230, 232, 234 which allow crankcase gases to flow through sleeve 198. Referring to FIG. 6A, sleeve 198 is coupled to drive pin 132 of motor 92 and is biased away from pintle 96 via bias spring 204. Bias spring 204 is disposed between sleeve 198 and metering wall 222 of housing 196.

Pintle 200 is provided to control the flow of crankcase gases through assembly 48 based on the differential pressure ($P_{DIFF}$) across assembly 48. Referring to FIG. 7B, pintle 96 includes adjacent body portions 236, 238, 240 used to control a size of a metering orifice 224 between wall 222 and pintle 200 during cold operating conditions when sleeve 198 is moved proximate pintle 200.

Pintle 200 further includes adjacent body portions 242, 244, 246 used to control a size of metering orifice 248 between metering wall 230 and pintle 200. It should be understood that the diameter of each of body portions 236, 238, 240 and portions 242, 244, 246 may be varied based upon a desired flow through assembly 48.

The operation of valve assembly 48 during cold and warm operating conditions will now be explained. Referring to FIGS. 6A, 6D, during cold operating conditions when a temperature of the crankcase gases communicating with assembly 48 is below a predetermined temperature, motor 92 maintains sleeve 198 at a first position. As a results, the flow of crankcase gases through assembly 48 is controlled by the position of pintle 96 with respect to metering wall 222. Like pintle 96 in assembly 42, the position of pintle 200 is determined by a differential pressure ($P_{DIFF}$) across assembly 48. In particular, referring to FIGS. 7A, 7B, 3A, 6A, the position of pintle portions 236, 238, 240 of assembly 48 with respect to metering wall 222 are controlled similar to the position of pintle portions 140, 142, 144 of assembly 42 with respect to metering wall 122. Referring to FIG. 9, the flow characteristic of assembly 48 during cold operating conditions for various positions of pintle 200 is shown by curve 148.

Figure 6E:
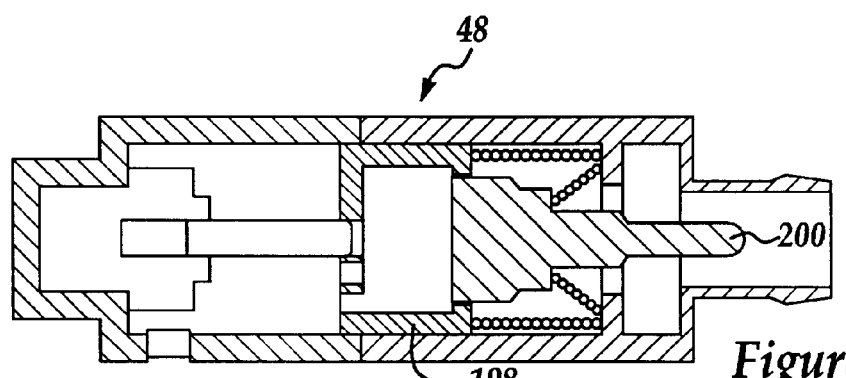
Figure 6F:
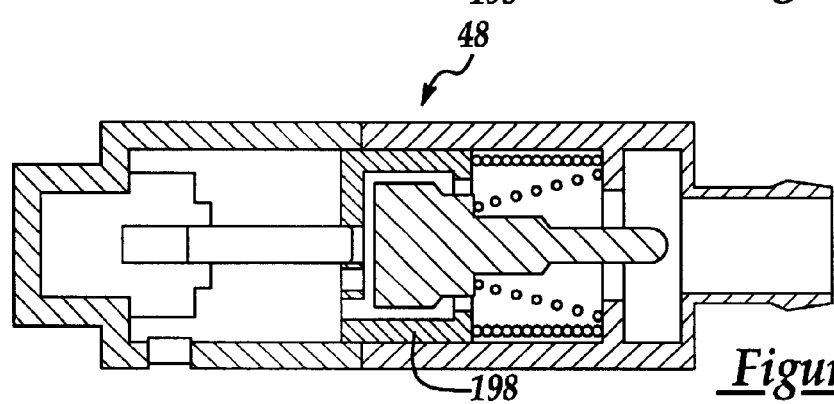

Referring to FIGS. 6E, 7B during warm operating conditions when the temperature of the crankcase gases communicating with assembly 48 are greater than a predetermined temperature, sleeve 198 is moved toward pintle 200. The metering wall 230 of pintle 200 overlaps one of pintle portions 242, 244, 246 to define a metering orifice 248. Because metering orifice 248 always has a cross-sectional area smaller than metering orifice 224, during warm operating conditions when sleeve 198 is at a full-extended position proximate pintle 200, orifice 248 controls the flow through assembly 48 during warm operating conditions instead orifice 224.

When throttle plate 70 communicating with intake manifold 24 is at a closed position during engine idle speeds, the differential pressure ($P_{DIFF}$) across assembly 48 is relatively high. The high differential pressure induces pintle 200 to move right in FIG. 6E such that pintle portion 246 is overlapped by metering wall 230 of fully-extended sleeve 198. The radial distance between pintle portion 246 and wall 230 may be 0.1 mm, for example. As a result, small metering orifice 248 provides a relatively low flow rate through valve assembly 48. Referring to FIGS. 7B, 9, the flow rate may be maintained at approximately a constant value as illustrated by flow values 156, 158 of flow curve 150.

When throttle plate 70 is moved toward an open position, the differential pressure ($P_{DIFF}$) is decreased. The decreasing differential pressure induces pintle 200 to move left in FIG. 6E such that pintle portion 244 is overlapped by metering wall 230 of fully-extended sleeve 198. As a results, the size of metering orifice 248 is increased which increases the flow rate through valve assembly 48. Referring to FIGS. 7B, 9, the flow rate may increase from flow value 156 to value 162 as pintle portion 244 moves past metering wall 230.

When throttle plate 70 reaches a full-open position, the differential pressure ($P_{DIFF}$) approaches a minimum differential pressure level. Referring to FIG. 6D, the minimum differential pressure level induces pintle 200 to move further left (in FIG. 6D) such that pintle portion 242 is overlapped by metering wall 230. The radial distance between pintle portion 242 and wall 230 may be 0.15 mm, for example. The relatively large metering orifice 248 provides a relatively high flow rate through valve assembly 48. Referring to FIGS. 7B, 9, for example, the flow rate through assembly 48 may range from flow value 162 to flow value 166.

The valve assemblies 42, 44, 46, 48, control system 14, and the method for controlling the flow of gases from an engine crankcase to an intake manifold has significant advantages over known systems. In particular, the valve assemblies 42, 44, 46, 48 and control methodology described herein increases a flow of gases through the passage between the crankcase and the intake manifold when a temperature of the gases is below a predetermined temperature to reduce and/or eliminate: (i) freezing and development of ice blockages within the valve assembly, and (ii) sludge formation from trapped crankcase gases reacting with engine oil.

We claim:

1. A method for controlling flow of gases through a passage between an engine crankcase and an engine intake manifold, the method comprising:

increasing a flow of gases through the passage between the crankcase and the intake manifold when a temperature of the gases is below a predetermined temperature.

2. The method of claim 1 wherein the step of increasing the flow of gases through the passage includes decreasing a flow path restriction of the gases when said temperature is below said predetermined temperature.

3. A method for controlling flow of gases through a passage between an engine crankcase and an engine intake manifold, the method comprising:

controlling a flow of gases through the passage between the crankcase and the intake manifold when a temperature of the gases is above a predetermined temperature; and, increasing said flow of gases through the passage when said temperature of the gases is below a predetermined temperature.

4. A valve assembly for controlling flow of gases through a passage between an engine crankcase and an engine intake manifold, comprising:

a housing configured to be coupled with the passage; and, a flow control device disposed in said housing, said device increasing a flow of said gases through said housing when a temperature of said gases is below a predetermined temperature.

5. The valve assembly of claim 4 wherein said housing includes an inlet aperture communicating gases from said passage into said housing, wherein said flow control device includes:

a piston configured to move adjacent said inlet aperture; and, an actuator coupled to said piston, said actuator moving said piston to increase flow of said gases through said aperture when said temperature of said gases is below said predetermined temperature.

6. The valve assembly of claim 5 wherein said actuator comprises one of a wax motor, a bimetallic actuator, or an electrically actuated solenoid.

7. The valve assembly of claim 4 further comprising a vacuum actuated pintle disposed downstream of said flow control device, said flow control device comprising:

a sleeve member configured to be concentrically received around a portion of said pintle at a first position to restrict flow of gases through said housing, said sleeve member further configured to be moved to a second position away from said pintle to increase flow of gases through said housing; and, an actuator coupled to said sleeve, said actuator moving said sleeve toward said second axial position when said temperature of said gases is below said predetermined temperature.

8. The valve assembly of claim 7 wherein said actuator comprises one of a wax motor, a bi-metallic actuator, or an electrically actuated solenoid.

9. A control system for controlling flow of gases through a passage between an engine crankcase and an engine intake manifold, the system comprising:

a temperature sensor generating a first signal indicative of a temperature of said engine;

a valve assembly having a housing and a flow control device disposed in said housing, said housing being configured to be coupled with the passage, said flow control device being configured to increase a flow of said gases through said housing responsive to a second signal; and, a controller operably connected to said temperature sensor and said valve assembly, said controller generating said second signal when said first signal indicates said temperature is below a predetermined temperature.

10. The system of claim 9 wherein said temperature comprises one of a temperature of gases communicating with said valve assembly, an engine oil temperature, an engine coolant temperature, and an engine block temperature.

* * * * *